(12) United States Patent
Kwok et al.

(10) Patent No.: US 8,948,709 B2
(45) Date of Patent: Feb. 3, 2015

(54) TRANSMIT/RECEIVE SWITCH

(75) Inventors: Terence Chi-Fung Kwok, Middlesex (GB); Timothy Newton, Suffolk (GB); Simon Chang, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 589 days.

(21) Appl. No.: 13/299,263

(22) Filed: Nov. 17, 2011

(65) Prior Publication Data

US 2012/0295559 A1    Nov. 22, 2012

(30) Foreign Application Priority Data

Nov. 18, 2010    (GB) .................................. 1019515.4

(51) Int. Cl.
*H04B 1/44*       (2006.01)
*H04B 1/48*       (2006.01)

(52) U.S. Cl.
CPC ....................................... *H04B 1/48* (2013.01)
USPC .................................. 455/83; 455/78; 455/73

(58) Field of Classification Search
CPC ......... H03H 7/42; H01P 5/10; H03F 2200/09; H01Q 1/2291; H01Q 1/243; H03J 2200/10; H04M 2250/02; H04M 2250/06; H04W 52/0274; H04W 88/06
USPC ............................................... 455/73, 78, 83
See application file for complete search history.

(56) References Cited

U.S. PATENT DOCUMENTS

| | | | |
|---|---|---|---|
| 6,097,349 A * | 8/2000 | Sanford | 343/859 |
| 6,397,044 B1 * | 5/2002 | Nash et al. | 455/73 |
| 7,092,678 B2 * | 8/2006 | Shih | 455/78 |
| 7,209,727 B2 * | 4/2007 | Castaneda et al. | 455/341 |
| 7,269,441 B2 * | 9/2007 | Ella et al. | 455/553.1 |
| 7,292,827 B2 * | 11/2007 | McCorkle | 455/78 |
| 7,526,256 B2 * | 4/2009 | Bhatti et al. | 455/73 |
| 7,873,385 B2 * | 1/2011 | Boireau et al. | 455/553.1 |
| 7,979,043 B2 * | 7/2011 | Rofougaran | 455/292 |
| 8,547,185 B2 * | 10/2013 | Soman | 333/25 |
| 2003/0124987 A1 * | 7/2003 | Shimada et al. | 455/84 |
| 2004/0219884 A1 * | 11/2004 | Mo et al. | 455/67.11 |
| 2004/0253939 A1 * | 12/2004 | Castaneda et al. | 455/341 |
| 2005/0153664 A1 * | 7/2005 | Moloudi et al. | 455/78 |
| 2006/0094357 A1 * | 5/2006 | McCorkle | 455/41.2 |
| 2007/0152904 A1 * | 7/2007 | Castaneda et al. | 343/859 |
| 2008/0014878 A1 * | 1/2008 | Rofougaran | 455/117 |
| 2008/0102760 A1 * | 5/2008 | McConnell et al. | 455/73 |

(Continued)

FOREIGN PATENT DOCUMENTS

WO    2008/066344 A1    6/2008

OTHER PUBLICATIONS

UK Search Report dated Mar. 5, 2012 for corresponding GB application.

(Continued)

*Primary Examiner* — Lewis West

(74) *Attorney, Agent, or Firm* — Vorys, Sater, Seymour and Pease LLP; Vincent M DeLuca

(57) ABSTRACT

A transceiver includes a first circuit having a connector for connection to an antenna and receiving circuitry, and a second circuit having transmitting circuitry. The first and second circuits are coupled using a balun, where the balun is arranged so that its unbalanced side is in the first circuit and its balanced side is in the second circuit.

25 Claims, 14 Drawing Sheets

(56) References Cited

U.S. PATENT DOCUMENTS

| | | | |
|---|---|---|---|
| 2008/0278258 A1* | 11/2008 | Liu | 333/25 |
| 2009/0195324 A1* | 8/2009 | Li et al. | 333/25 |
| 2009/0273411 A1* | 11/2009 | Roufoogaran | 333/25 |
| 2009/0305647 A1* | 12/2009 | Mckay et al. | 455/73 |
| 2010/0053446 A1* | 3/2010 | Tkaczewski | 348/607 |
| 2010/0109798 A1* | 5/2010 | Chu | 333/124 |
| 2011/0009074 A1* | 1/2011 | Hsu et al. | 455/73 |
| 2011/0065400 A1* | 3/2011 | Teikari et al. | 455/129 |
| 2011/0281527 A1* | 11/2011 | Chiang et al. | 455/73 |

OTHER PUBLICATIONS

German Examination Report dated Aug. 2, 2012, in corresponding German patent application.

\* cited by examiner

-- Prior Art --

-- Prior Art --

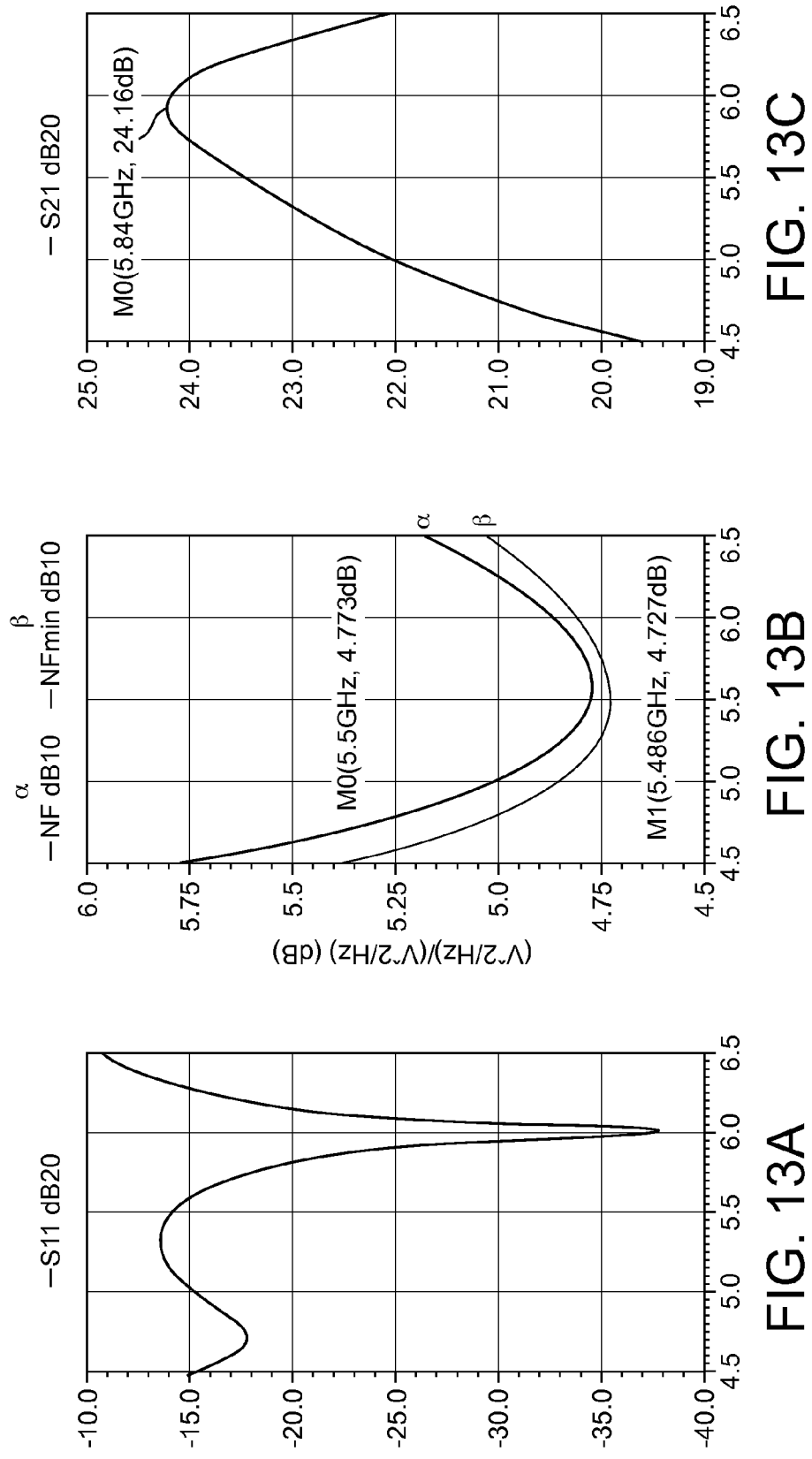

TRANSMIT/RECEIVE SWITCH

CLAIM OF FOREIGN PRIORITY

This application claims priority under 35 U.S.C. §119 from Application No. GB1019515.4 filed in the United Kingdom on Nov. 18, 2010, the contents of which are incorporated by reference herein in their entirety.

BACKGROUND OF THE INVENTION

A balun is a circuit component frequently used to connect together sections of different impedances. A balun is essentially a transformer connecting first and second circuits that generates a signal in a first circuit based on the signal in a second circuit. More particularly, a balun can convert a signal that is symmetrical (or "balanced") about ground to a signal that is asymmetrical (or "unbalanced") about ground and vice versa.

In a transceiver, transmitting and receiving circuitry are commonly arranged to receive a differential input from a balun whilst the antenna is arranged on the unbalanced side. This means that the choice of balun and of the various components used in the two types of circuitry is made in dependence on each other. When choosing a balun for a particular circuit, an engineer will make a compromise between these two design constraints.

For example, a power amplifier (PA) in the transmitting circuitry ideally requires a balun that supports large currents and which has a high quality factor, Q, for a high efficiency and PA linearity. The quality factor is a measure of how quickly energy is dissipated from an oscillating system. A high Q means that energy is lost slowly whilst a low Q means that energy is lost quickly. In contrast to the transmitting circuitry, the low noise amplifier (LNA) in the receiving circuitry ideally requires a high voltage gain with a low noise figure (NF). As NF is directly related to the Q of the balun, it can be seen that the choice of balun is a compromise between these two opposing design considerations.

With both the transmitting and receiving circuitry on the one side, additional components need to be added to isolate components in the transmitting circuitry from components in the receiving circuitry. If the circuits were not isolated from each other during operation, damage could occur to these components. This possibility of damage restricts the choice of possible LNA core devices and topology. For example, sometimes a "slow" MOS device with a long channel length is selected for the LNA in the receiving circuitry. This choice can reduce the damage caused to the LNA by the large switching voltages used by the PA in the transmitting circuit. However, slow MOS devices are not preferred for LNA's that need to operate at high frequencies.

There are two primary ways in which the two circuits are isolated from each other: Firstly, the PA and LNA may be shared on the balanced side of the balun, as illustrated in FIG. 1. This configuration may include switching units and/or additional baluns; Secondly an external switch may be used, as illustrated in FIG. 2.

SUMMARY OF THE INVENTION

The present invention is aimed towards minimizing the interdependence in design choices between the receiving and transmitting circuitry.

The present invention is further aimed towards improving a fully integrated transceiver.

According to a first aspect of the present invention, there is provided a transceiver comprising; a first circuit comprising a connector for connection to an antenna and receiving circuitry; and a second circuit comprising transmitting circuitry; and wherein the first and second circuits are coupled using a balun, the balun being arranged so that its unbalanced side is in the first circuit and its balanced side is in the second circuit.

The unbalanced side of the balun may be arranged in the first circuit in such a way that, when the transceiver is receiving a signal, the receiving circuitry receives a signal from the antenna through the unbalanced side of the balun.

The receiving circuitry may comprise a first switching arrangement and the transmitting circuitry may comprise a second switching arrangement.

The first and second switching arrangements may be arranged to be operated so that either the transmitting circuitry is arranged to transmit a signal or the receiving circuitry is arranged to receive a signal.

The receiving circuitry may be arranged to receive a signal when a switch in the first switching arrangement is open and may be further arranged to not receive a signal when said switch in the first switching arrangement is closed.

The transmitting circuitry may further comprise a differential power amplifier that is arranged to transmit signals to the antenna through both the balanced and unbalanced sides of the balun by inputting a signal into both ends of the balanced side of the balun.

The second switching arrangement may comprise a variable capacitor, the variable capacitor being arranged in parallel with the power amplifier and wherein the transmitting circuitry is arranged to either transmit signals or to not transmit signals in dependence on the capacitance of the variable capacitor.

The power amplifier may comprise switching devices that act as the second switching arrangement.

The switching devices of the power amplifier may all have to be on to deactivate the transmitting circuitry.

The transceiver may further comprise a power supply, wherein the power supply supplies power to the balanced side of the balun and wherein there is a switch interposed between the power supply and the balun.

The transceiver may be arranged such that, when it is receiving a transmission or expecting to receive a transmission imminently, the first switching arrangement is arranged so that the receiving circuitry is arranged to receive signals and the second switching arrangement is arranged so that the transmitting circuitry is arranged to not transmit signals.

The transceiver may be arranged such that, when it is transmitting a transmission or expecting to transmit a transmission imminently, the first switching arrangement is arranged so that the receiving circuitry is arranged to not receive a signal and the second switching arrangement is arranged so that that transmitting circuitry is arranged to transmit a signal.

The receiving circuitry may comprise a single ended low noise amplifier, the low noise amplifier receiving its input from one of the ends of the balun on the unbalanced side of the balun.

The receiving circuitry may further comprise a resistive feedback low noise amplifier that can be arranged to receive a signal from the antenna in addition to a feedback signal.

The transmitting circuitry, receiving circuitry and balun may be integrated onto a single chip.

The transceiver may further comprise a tuning capacitor in the first circuit, wherein the tuning capacitor is arranged in parallel with the unbalanced side of the balun and wherein the transceiver is arranged to transmit or receive a signal with a frequency that lies within a signal band of interest. The capacitance of the tuning capacitance may be configured such that the frequency of any pole generated by the transceiver when in operation lies outside of said signal band of interest. The tuning capacitor may be further arranged to be in parallel with the first switching arrangement.

A transceiver as claimed in any preceding claim, wherein the receiving circuitry and the unbalanced side of the balun are arranged in the first circuit in parallel.

The first circuit may further comprise a first capacitor, wherein the first capacitor is arranged in series with the receiving circuitry and arranged in parallel with the unbalanced side of the balun, and wherein the transceiver is arranged to transmit or receive a signal of a frequency that lies within a signal band of interest and the capacitance of the first capacitor is configured such that the frequency of any pole generated by the transceiver when in operation lies outside of said signal band of interest.

The first circuit may further comprise a second capacitor, wherein the second capacitor is arranged in parallel with both the receiving circuitry and the unbalanced side of the balun, wherein the transceiver is arranged to transmit or receive a signal of a frequency that lies within a signal band of interest and the capacitance of the second capacitor is configured such that the frequency of any pole generated by the transceiver when in operation lies outside of said signal band of interest.

The transceiver may have a receive path comprising the receiving circuitry, the receive path being capable of performing receive processing on signals received from the antenna connector and being independent of the transmitting circuitry.

The transceiver may further have a transmit path comprising the transmitting circuitry, the transmit path being capable of performing transmit processing on signals to be sent to the antenna connector and being independent of the receiving circuitry.

The transceiver may comprise a signal path from the unbalanced side of the balun to the antenna connector and a receive path that branches from that signal path, wherein the receive circuitry is arranged in the receive path.

The transceiver may comprise a tuning capacitor in the receive path. The transceiver may be further arranged to transmit or receive a signal with a frequency that lies within a signal band of interest and the capacitance of the tuning capacitance in the receive path may be configured such that the frequency of any pole generated by the transceiver when in operation lies outside of said signal band of interest.

In a second aspect of the present invention, there is provided a method for receiving and transmitting data in a transceiver comprising: a first circuit comprising a connector for connecting to an antenna and receiving circuitry; and a second circuit comprising transmitting circuitry; wherein the first and second circuits are coupled using a balun, the balun being arranged so that its unbalanced side is in the first circuit and its balanced side is in the second circuit; and wherein the unbalanced side of the balun is arranged in the first circuit in such a way that, when the transceiver is receiving a signal, the receiving circuitry receives a signal from the antenna through the unbalanced side of the balun.

BRIEF DESCRIPTION OF THE DRAWINGS

FIG. 13 shows some of the results obtained using the test bench circuits of FIGS. 9 and 10.

DETAILED DESCRIPTION OF THE INVENTION

Figure 1:
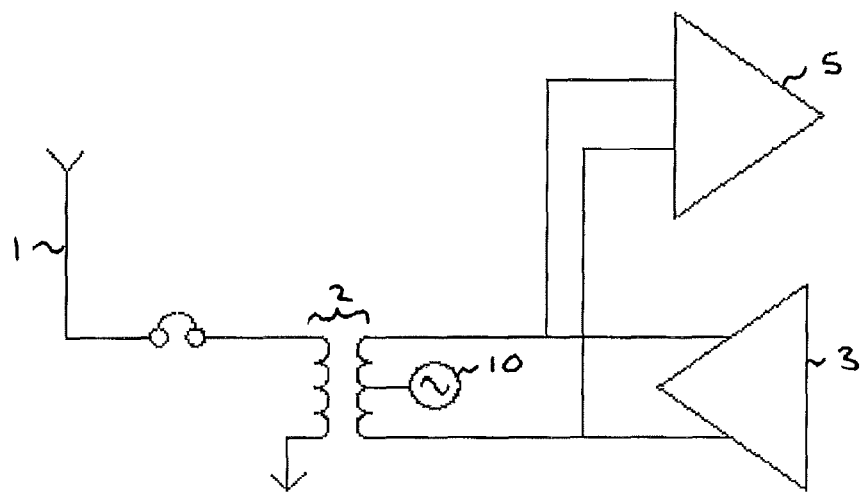
FIGS. 1 and 2 show examples of conventional transceiver circuits.
Figure 2:
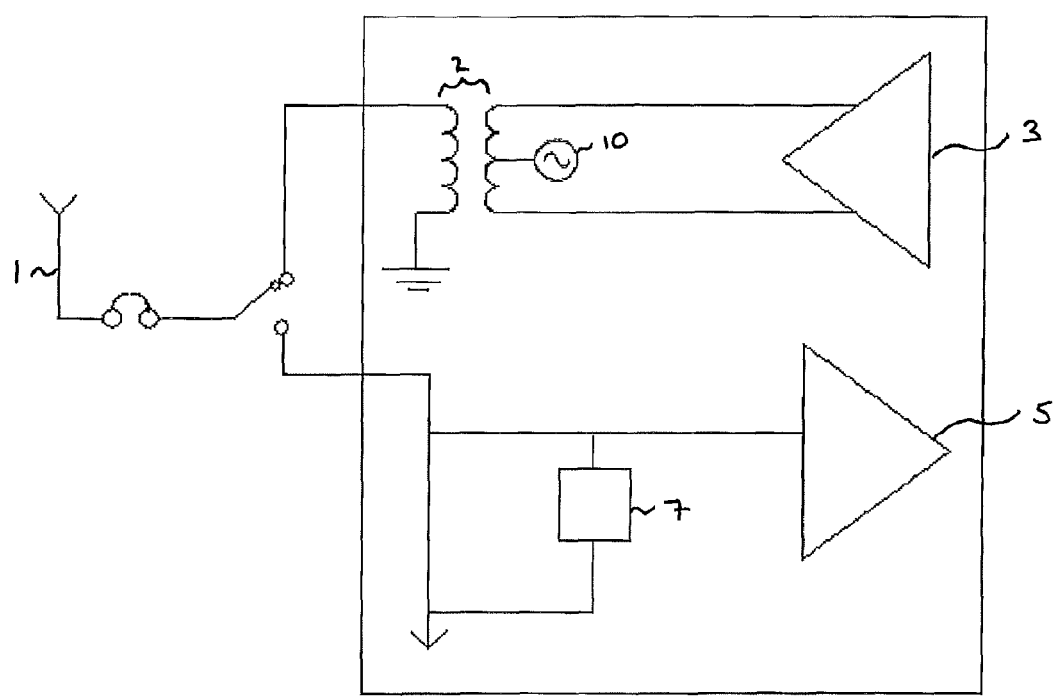

An embodiment of the present invention will now be discussed with reference to the figures. Features in the different embodiments that are labeled with the same reference numeral are equivalent to each other.

A transceiver typically comprises an antenna, receiving circuitry, transmitting circuitry and a balun. The receiving circuitry comprises an LNA. The transmitting circuitry comprises a PA. When the transceiver is transmitting, the transmitting circuitry is enabled and the receiving circuitry is disabled. When the transceiver is receiving, the receiving circuitry is enabled and the transmitting circuitry is disabled. The receiving circuitry is arranged such that the LNA is on the unbalanced side of the balun, along with the antenna. The transmitting circuitry is arranged such that the PA is on the balanced side of the balun.

The balun is chosen to match the design considerations of the PA. The PA can be a differential PA.

The LNA can be a single-ended LNA. Although differential LNA's are normally used in the design as they reduce some sources of noise, differential LNA's use twice the amount of current than a single-ended LNA. This can be detrimental when managing power resources, particularly in systems where the receiver is turned on more frequently than the transmitter. The LNA can have any architecture but is preferably a resistive-feedback LNA.

Figure 3A:
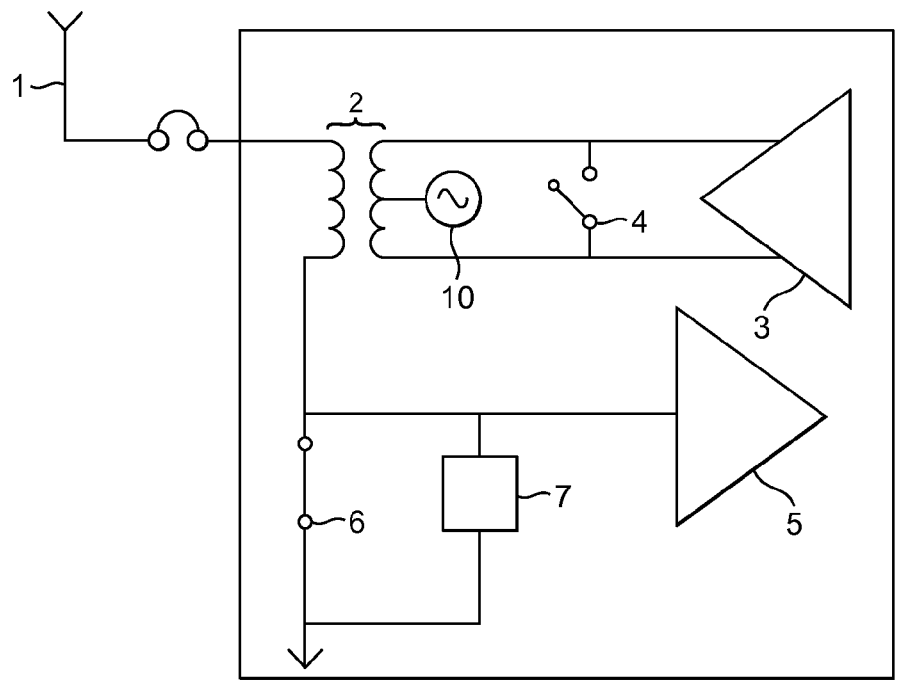
FIGS. 3A and 3B show a transceiver circuit according to one embodiment of the present invention.
Figure 3B:
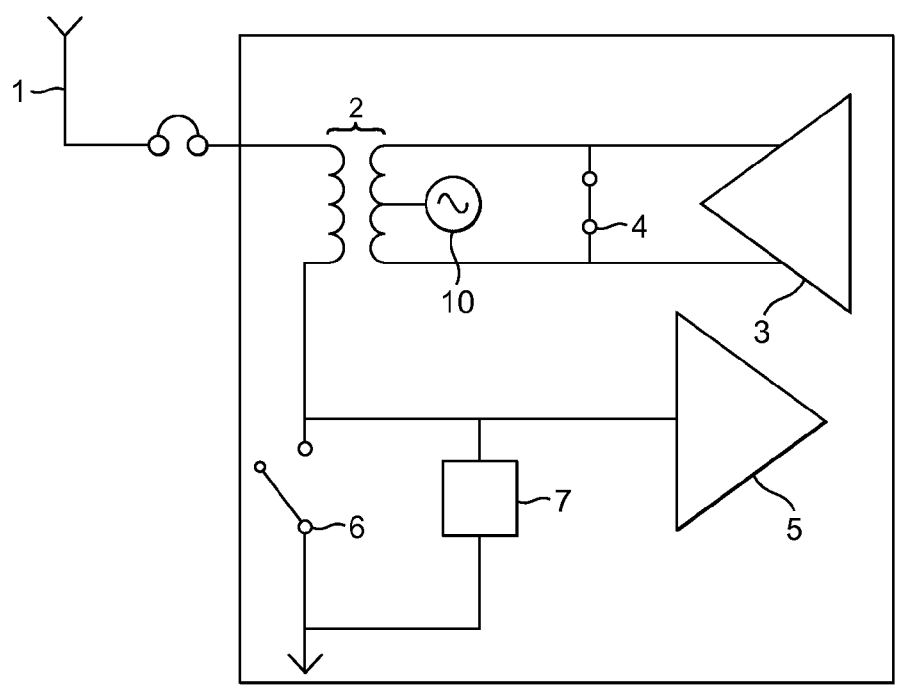

A possible transceiver architecture is illustrated in FIGS. 3A and 3B. In FIG. 3A, the transceiver is operating in transmission mode. An antenna, 1, receives a signal from the unbalanced side of the balun, 2, by means of a signal provided by the PA, 3, to the balanced side of the balun, 2. The balun 2 is the means by which the signal from the PA circuitry in a first circuit is converted from a balanced signal in the first circuit to an unbalanced signal in a second circuit, the second circuit comprising the antenna 1. In this example, the PA is enabled by means of a PA switch, 4. In this example, the PA switch 4 is open, which forces the PA current path to become the path of least resistance for the current. The transmitting circuitry is thus enabled. Whilst the PA, 3, is operating, the LNA, 5, which is attached to the opposite end of the unbalanced side of the balun 2 to the antenna 1, is disabled by means of an LNA switch 6. In contrast to PA switch 4, the LNA switch 6 is closed and, being closed, provides a path of least resistance for the current to flow along in preference to going through the LNA 5. LNA switch 6 also provides a good short to ground for the balun when closed.

Preferably, the LNA also has an electrostatic discharge device (ESD) 7. The ESD is useful as it can protect circuit components from shorting out when the voltage difference across them becomes too high.

FIG. 3B illustrates what happens in the same transceiver architecture when the transceiver is operating in receiving mode. An antenna, 1, receives a signal from an external system. It passes this signal to one end of the unbalanced side of the balun 2. On the balanced side of the balun, 2, the PA 3, and hence the transmitting circuitry, is disabled by means of closing the previously open PA switch 4. Closing the PA switch 4 provides a path of least resistance for the current to flow in preference to the path through the PA. On the unbalanced side of the balun 2, the LNA 5 is enabled by opening the previously closed LNA switch 6. The signal received at the antenna is thus passed through the unbalanced side of the balun 2 to the receiving circuitry and is fed into the LNA 5. The signal flows along this path as the opening of the LNA switch 6 makes the path of least resistance lie through the LNA 5.

By separating the receiving circuitry and transmitting circuitry as proposed, i.e. by arranging them to lie on opposite sides of a balun, the two circuitry designs are decoupled. Therefore, components chosen for use in the receiving circuitry, such as those making up the LNA, do not have to be chosen based on the transformation ratio or other qualities of the balun. The choice of balun may therefore be optimized for performance of the PA whilst the LNA choice can rest primarily on the qualities of the receive circuit. The performance of the LNA can therefore be optimized and become superior to the conventional approach. As the choice of balun in the present invention can be optimized for the PA, it can be termed the PA balun.

By being arranged on the opposite side of the balun to the PA, the LNA is protected from the potentially large PA voltage swings. Therefore, the LNA 5 of the present system can last longer than in conventional systems.

Further, by being arranged on the opposite side of the balun 2 to the PA 3, the LNA 5 can be a single ended device. This reduces the amount of power consumed by the transceiver and may therefore be used to help prolong battery life.

During transmission mode, LNA switch 6 will contribute to the power loss of the system while PA switch 4 may either increase the capacitive loading or reduce the PA's power-added efficiency (PAE) (depending on how the PA switch is implemented). The PAE is a measure of the efficiency of a power amplifier, taking into account the gain of the amplifier.

The LNA 5 should be impedance matched to the unbalanced side of the balun 2. This may require additional circuitry such as a variable capacitor.

To examine the effect the novel circuitry arrangement has on various components of the system, it is useful to run a test bench simulation. It is also useful to run these simulations using equivalent circuits to simplify the calculations.

Figure 4:
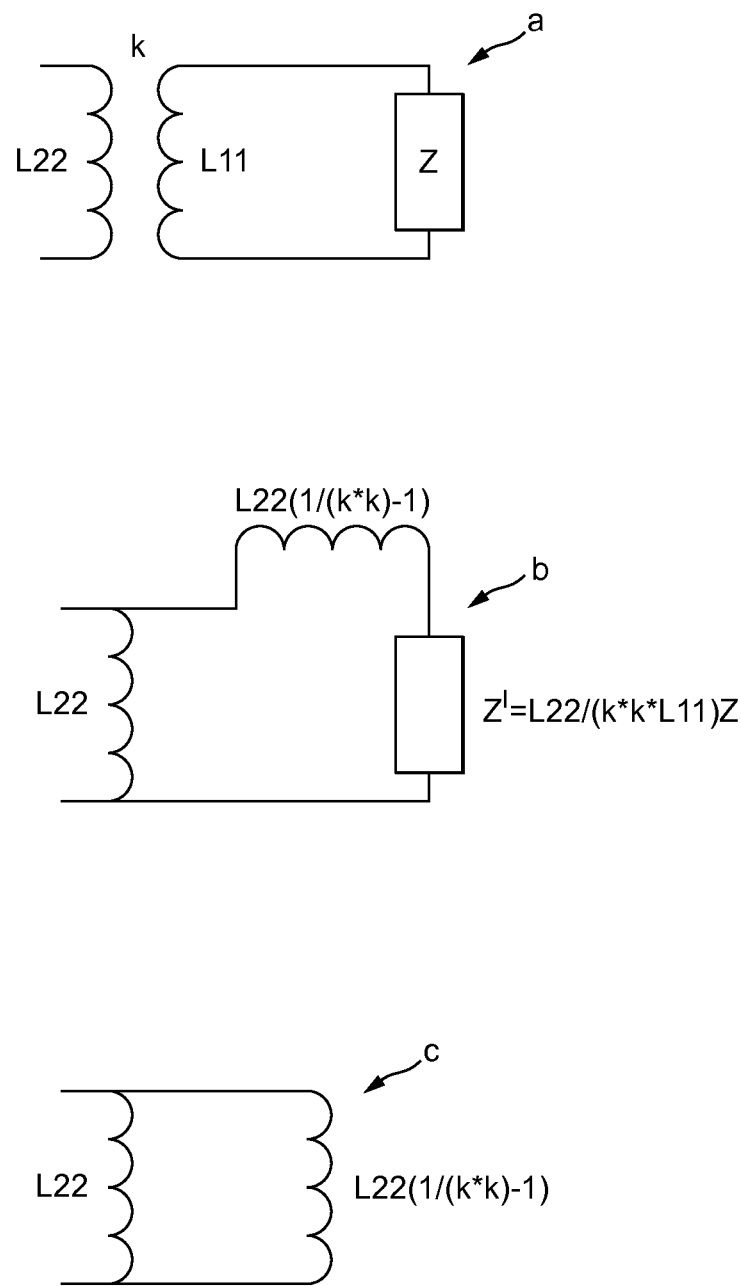
FIG. 4 shows the derivation of a equivalent circuit for two circuits linked by a balun.

FIG. 4 illustrates the derivation of an equivalent circuit of the disclosed configuration of the PA balun, receiving circuitry and transmitting circuitry, from the perspective of the LNA 5. We assume that the unbalanced side of the balun 2, to which the LNA is attached, has an inductance $L22$ whilst the inductance of the balanced side of the balun 2 has an inductance $L11$. The power amplifier and associated circuitry of the transmitting circuitry shall be assumed to provide an impedance of Z. This is illustrated at a in FIG. 4.

The dominating contributors to the value of Z are expected to be the capacitances of the cascode devices of the PA 3.

In FIG. 4, an equivalent circuit to that shown at a is illustrated at b. The inductor $L22$, which represents the unbalanced side of the balun 2, is connected in parallel to an inductor that represents the leakage current of the inductor $L22$ onto the unbalanced side of the circuit, and to an impedance $Z'$ that represents what the unbalanced side of the balun 2 experiences of the impedance Z of the PA 3 through the balun 2. The leakage current can be represented by a term $L22(1/(k*k)-1)$. The impedance $Z'$ is equal to $L22/(k*k*L11)Z$. In both of these equations, k represents the coupling coefficient of the balun and has a value that lies between 0 and 1. The coupling coefficient k is a numerical factor that represents the extent to which the unbalanced side of the balun is coupled to the balanced side of the balun. k is important for working out the amount of signal generated on one side of the balun when a signal is fed into the other side of the balun.

Now assume that the PA switch 4 is closed as the transceiver enters receiving mode. The load Z is effectively short circuited and can be removed from the equivalent circuit. What remains is illustrated at c in FIG. 4: two inductors, the first representing the inductance of the unbalanced side of the balun and the second representing the leaky inductance of the balanced side of the balun.

If there were no PA switch 4 to isolate the PA 3 during receiving mode, a pole and a zero would appear at the input of the LNA 5. The pole is formed by a combination of $L22$, $L22*((1/k*k)-1)$ and $Z'$. The zero is formed by a combination $L22*((1/k*k)-1)$ and $Z'$. The pole and zero correspond to respective peaks in the received signal noise at particular frequencies and are undesirable as they can block the antenna signal from the LNA 5.

Figure 5:
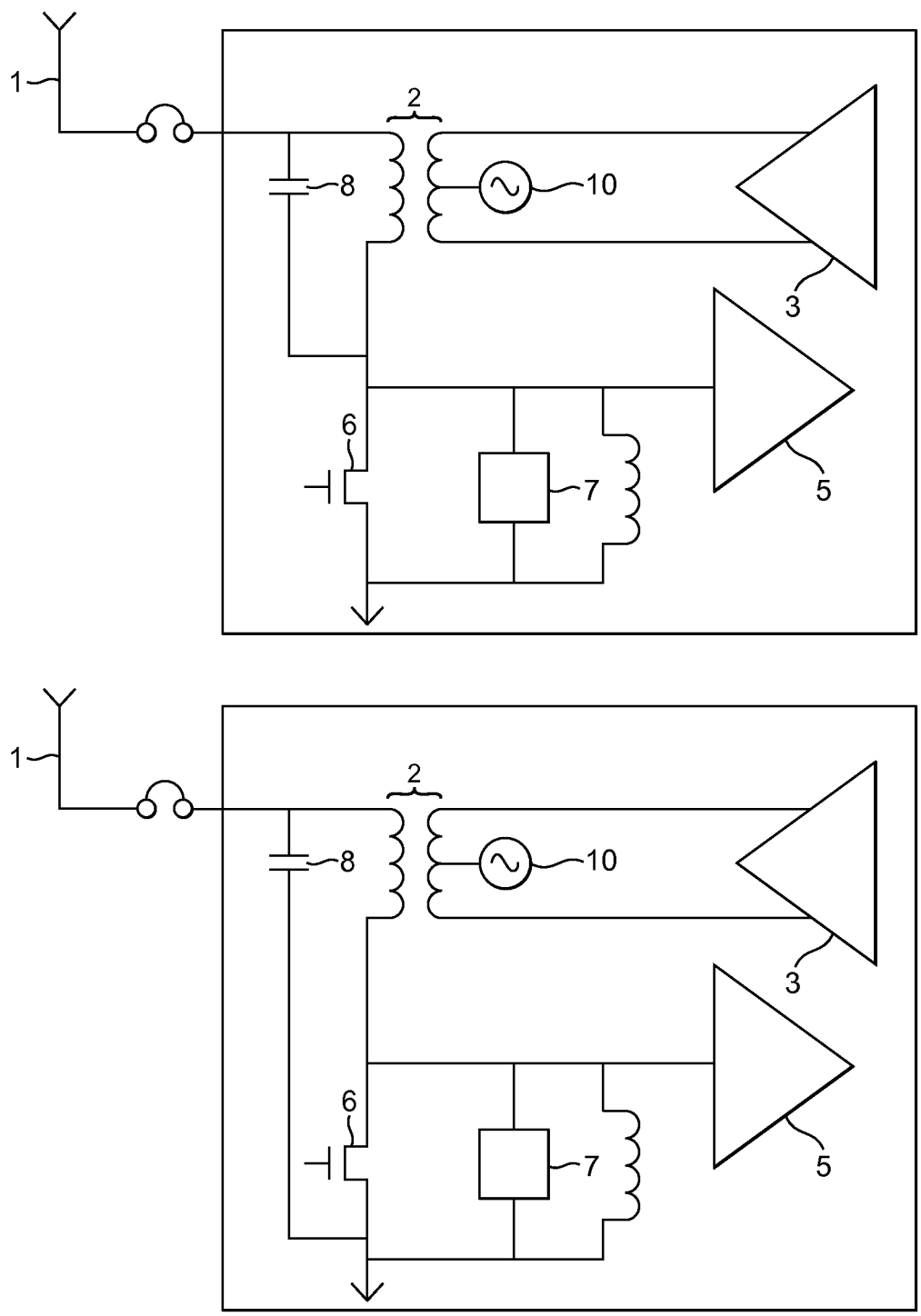
FIG. 5 shows an a transceiver circuit according to one embodiment of the present invention that utilizes tuning capacitors for changing the positions of frequency poles.

In theory, it is possible to design a PA 3 and a balun 2 so that the pole is generated sufficiently far enough away from the signal that it doesn't block the signal. Two possible ways of doing this are illustrated in FIG. 5 at a and b. A tuning capacitor 8 is inserted into the circuitry so that it is arranged parallel with the unbalanced side of the balun 2. The tuning capacitor is a circuit component which can be used to shift the position of any pole generated when the circuit is operating. The tuning capacitor may comprise a variable and/or a fixed capacitance. The tuning capacitor may be fixed at manufacture by trimming to be optimized for a specific frequency of operation.

Preferably, the circuit is arranged such that an increase in the capacitance of the tuning capacitor would act to move the pole away from the signal band of interest, where the signal band of interest is a band of frequencies centered about the frequency of operation of the transceiver. The tuning capacitor is predominantly used by the PA 3 to achieve the necessary impedance transformation with the balun. The arrangement illustrated at a in FIG. 5 is useful for situations in which the pole is generated sufficiently far away from the frequency band of interest. The pole is considered to be sufficiently far away from the frequency band of interest when it ceases to have a significant effect on the signal received from the antenna. Other components may also be used to ensure that the pole is generated sufficiently far away from the frequency band of interest. At a, the tuning capacitor 8 is arranged to connect to the LNA switch 6. This arrangement moves the pole to a lower frequency and makes it easier to co-design the PA 3 and the LNA 5. This arrangement is particularly suitable for narrowband applications. For wideband applications, the arrangement illustrated at b is more suitable. In wideband systems, the pole is typically generated at a relatively close frequency. At b, the tuning capacitor is arranged to be in parallel with both the unbalanced side of the balun 2 and the LNA switch 6.

Figure 6:
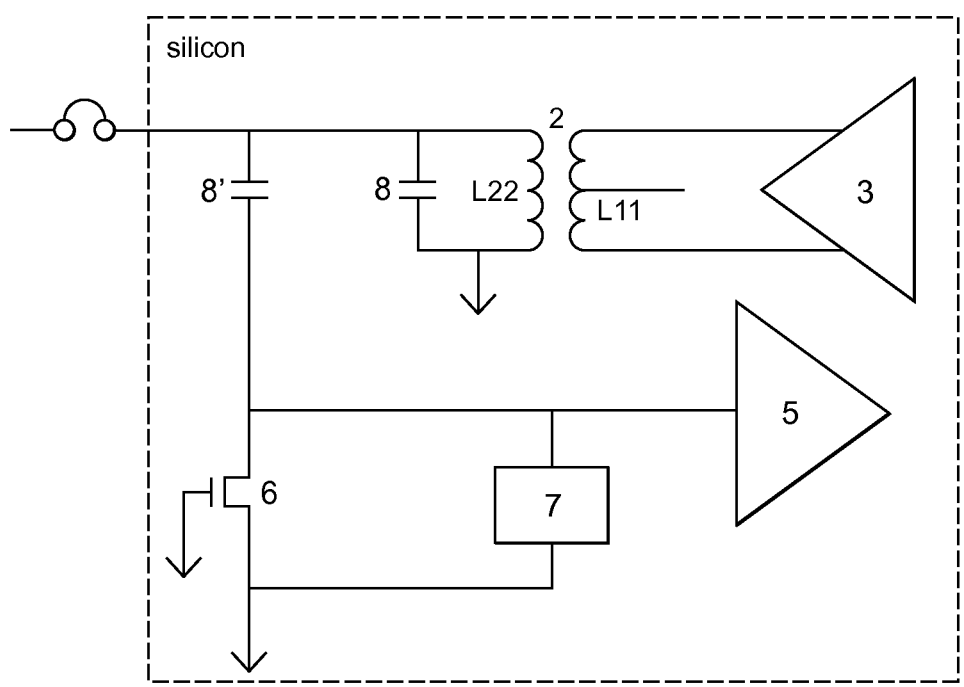
FIG. 6 shows a transceiver according to one embodiment of the present invention.

Preferably, there is more than one tuning capacitor in the transceiver. Preferably, they are arranged as shown in FIG. 6 and as described as follows: the transceiver comprises a first circuit and a second circuit. The first circuit comprises a connector for an antenna 1 and receive circuitry. Preferably, the receive circuitry comprises a single ended LNA 5, a switch 6 and a matching circuit. The matching circuit is used to compensate for impedance differences between the antenna and the receive circuitry. Preferably, all of these components are arranged in parallel with each other. Preferably, the second circuit comprises transmit circuitry. Preferably, the transmit circuitry comprises a PA 3. Preferably, the PA 3 is a differential power amplifier. The first and second circuits are connected by a balun 2. The balun comprises an unbalanced side and a balanced side. The unbalanced side of the balun 2 is arranged in the first circuit. The balanced side of the balun 2 is arranged in the second circuit. Preferably, the first circuit has an antenna path, a receive path and a balun path. Preferably, the antenna path branches into the receive path and the balun path. Preferably, the receive circuitry is arranged in the receive path and the balun is arranged in the balun path. Preferably, the antenna path is a path that leads directly to the antenna and/or antenna connector. Preferably, the first circuit comprises a first tuning capacitor 8. Preferably, the first tuning capacitor is arranged in the balun path in parallel with both the unbalanced side of the balun 2 and the LNA 5. Preferably, the first circuit comprises a second tuning capacitor 8'. Preferably, the second tuning capacitor is arranged in the receive path in series with the LNA 5 and in parallel with the unbalanced side of the balun 2. Preferably, the first and second capacitors in the first circuit such that, when the transceiver is arranged to transmit or receive a signal with a frequency that lies within a signal band of interest, the capacitance of the first and/or second capacitor is configured such that the frequency of any pole generated by the transceiver when in operation lies outside of said signal band of interest. Preferably, the total tuning capacitance is equal to the capacitance of the first capacitor plus the capacitance of the second capacitor. By controlling the ratio between the capacitance of the first capacitor and the capacitance of the second capacitor, the signal reflected at the LNA 5 can be minimized. Preferably, the ESD device 7 comprises a matching network that can also be used to minimize the signal reflected at the LNA 5.

Figure 10:
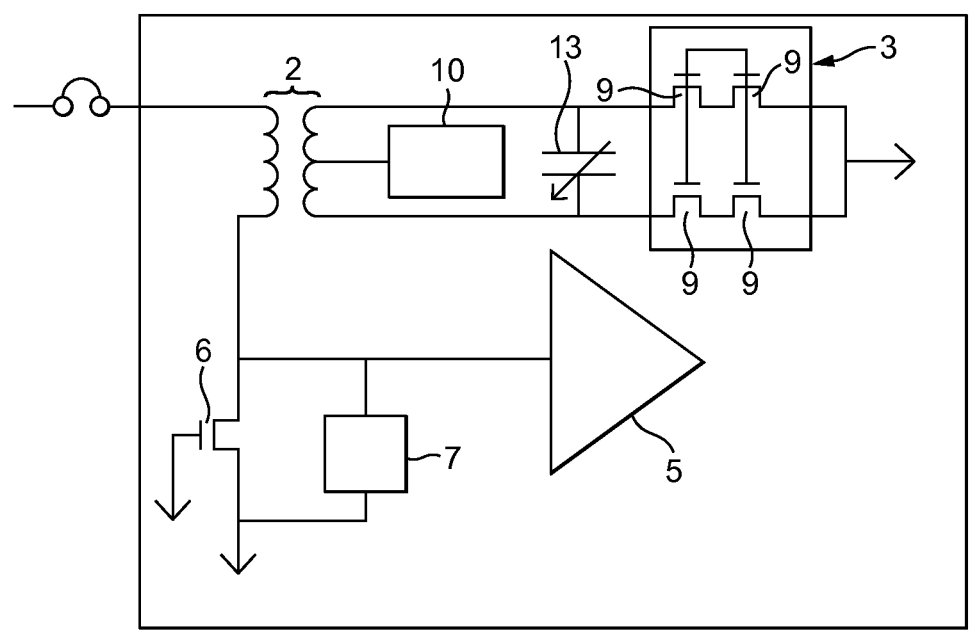

Circuits that use tuning capacitor arrangements in which the tuning capacitors are all arranged to be in parallel with the LNA 5, such as the arrangement shown at b in FIG. 5, can take significant benefit from implementing the disclosure illustrated in FIGS. 3 and 10 of the present application. However, it is much simpler to provide either an AC or a DC electrical short, such as by PA switch 4, to move the pole out of the frequency band of interest. With a PA switch 4 to isolate the PA 3, it will appear to the LNA 5 as though it is in a circuit in series with an inductor. The inductance of this inductor is derived from the characteristics of the balanced side of the balun 2 and can be tuned out by other on-chip components.

To test these equivalent circuit models (i.e. those depicted at band c in FIG. 4), simulations were run. The test bench circuits used to run the simulations are illustrated in FIG. 7 at a and b.

Figure 7:
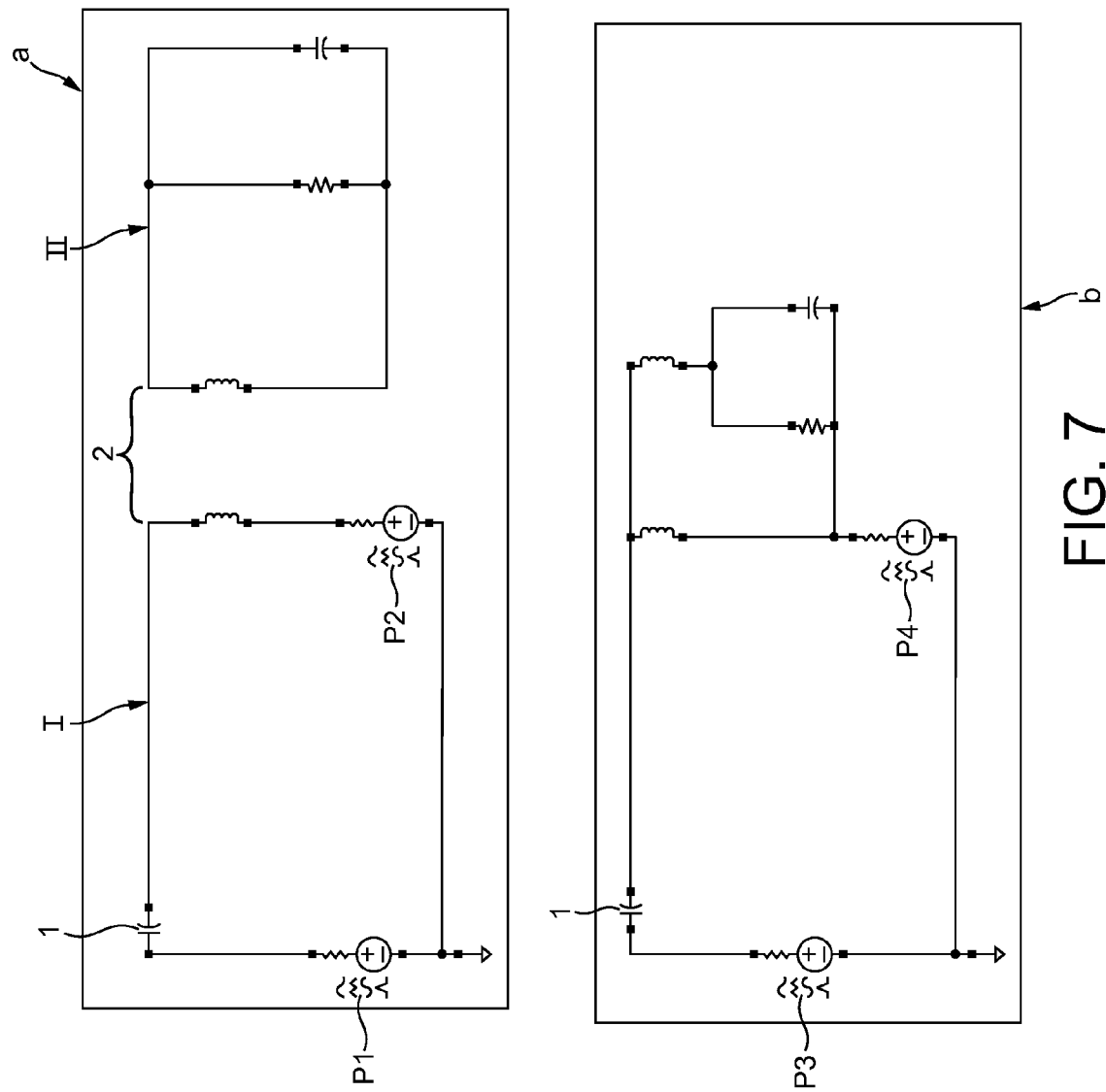
FIG. 7 shows two test bench circuits for the equivalent circuits of FIG. 4.

In FIG. 7, a circuit diagram for the ideal balun is illustrated at a. On the unbalanced side of the balun, which is represented by circuit I, an antenna is attached to the top end of the balun and receiving circuitry is attached to the bottom end of the balun. The unbalanced side of the balun has an inductance of L22. A port P1 is situated at the top end of the unbalanced side of the balun and is used to obtain information on the signal reflected back from the balun, i.e. the noise experienced by the antenna. A port P2 is situated at the bottom end of the balun on the unbalanced side of the balun and is positioned to determine the signal inputted to the LNA, i.e. the noise experienced by the LNA.

On the balanced side of the balun, which is represented by circuit II, the switch for enabling and/or disabling the transmitting circuitry and the transmitting circuitry are represented by a resistor with a resistance Rshort and a capacitor of capacitance CPA arranged in parallel with each other (the capacitance CPA and the resistance Rshort acting in combination to form the impedance Z at a in FIG. 4). The balanced side of the balun itself is represented as having an inductance of L 11. There is a coupling between the balanced and the unbalanced side of the balun with a coupling coefficient k, as previously explained.

In b of FIG. 7, a test bench circuit diagram of the equivalent circuit in a in FIG. 7 is illustrated. Instead of having two separate circuits, circuits I and II, there is only one. In this single circuit there are two loads arranged in parallel to each other. The first load represents the inductance contributed by the unbalanced side of the balun, L22. The second load represents the loads on the balanced side of the balun, from the perspective of original circuit I. The second load is formed from a combination of the following terms: $L22*((1/k^2)-1)$; a resistance $R=Rshort*L22/(k^2*L11)$; and a capacitance $c=CPA*k^2*L11/L22$. Both of these loads receive a signal from the antenna and pass a signal to port 4, which is positioned to determine the signal inputted to the LNA. Port P4 is in an analogous position to port P2 of the circuit diagram denoted at a in FIG. 7. There is also a port P3, in the circuit denoted by b in FIG. 7, that is positioned in an analogous position to port P1 so that it can be used to obtain information on the signals reflected back from the balun towards the antenna.

The following values were used when running simulations for the balun and the load capacitance:
L22=4 nH;
L11=1 nH;
K=0.707;
Rshort=either 0 or 1 Mohm (to mimic the enabling and disabling of the system); and CPA=1 pF.

Figure 8:
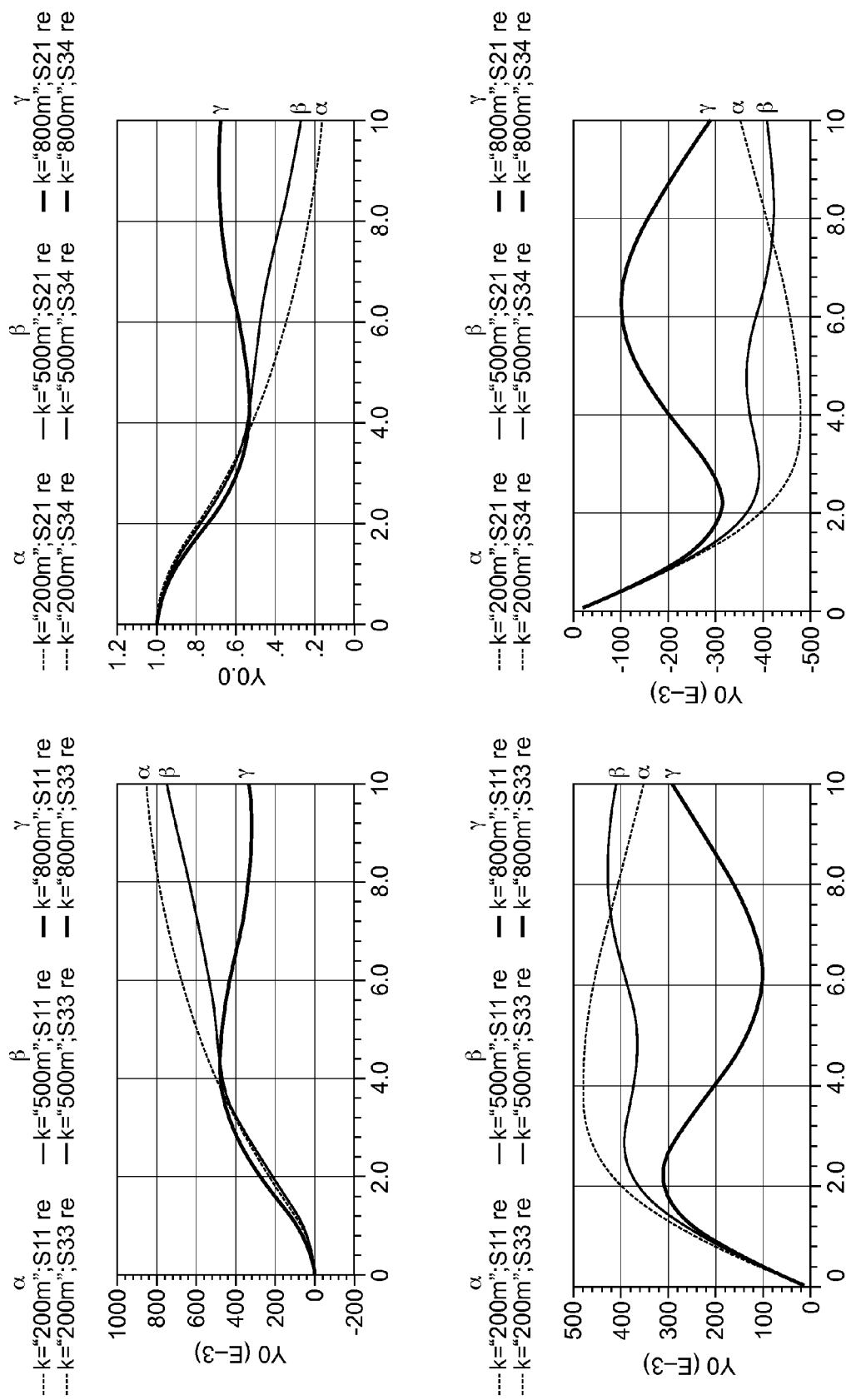
FIG. 8 shows some of the results obtained using the test bench circuit of FIG. 6.

Simulations using the circuits shown at a and b in FIG. 7 with the numerical values above were run to verify that the circuit shown at b in FIG. 7 is an equivalent circuit to that shown at a in FIG. 7 from the point of view of the receiving circuitry. The results can be seen in FIG. 8. The results are given in terms of the s-parameters of the system versus the frequency in Ghz. The s-parameters are a measure of the return loss in a system. They are normally represented as the terms $S_{xy}$ in the manner as follows: assume a signal enters a box at port 1. The reflected signal from port 1 is represented by the s-parameter $S_{11}$. The transmitted signal of the signal leaving the box at a second port, port 2, is represented by the s-parameter $S_{21}$. In the results of FIG. 8, the s-parameter responses for pairs $S_{11}$ and $S_{33}$ and for $S_{21}$ and $S_{43}$ are given. The s-parameters for the pairs of s-parameters are identical as the frequency of the signal is varied, i.e. the results of $S_{11}$ equal the results of $S_{33}$ and the results of $S_{21}$ equal the results of $S_{43}$. Therefore, the results of this test bench simulation indicate that the test bench circuit illustrated at b in FIG. 7 is a valid equivalent circuit to the circuit shown in a in FIG. 7.

The PA switch 4 whose state determines whether the transmitter is enabled or disabled is only representative of the concept of enabling and disabling the transmitter. Further possible examples of circuit arrangements that can be used for enabling and disabling the transmitter are described below and illustrated in FIGS. 9 and 10.

Also, the focus throughout the following is on the PA switch 4 as the LNA switch 6 is easier to implement (for example, LNA switch 6 may be a simple single-oxide NMOS device with a minimum length to minimize the power loss of the PA). However, both switches could be arranged to operate in a number of different ways.

Figure 9:
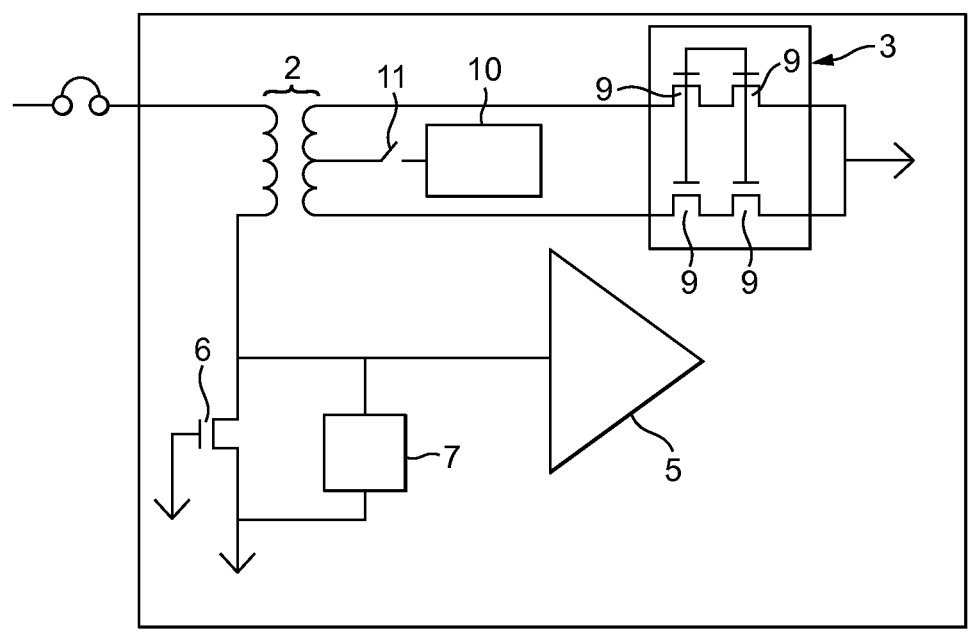
FIGS. 9 and 10 show possible switching arrangements that can be used in embodiments of the present invention.

FIG. 9 illustrates one practical implementation of the PA switch 4. In this example, the signal from the balanced side of the balun 2 is fed as an input into differential PA 3. The PA 3 comprises a plurality of switching devices 9 (the "PA devices") that can be used as PA switch 4. Preferably the PA switch 4 is considered to be closed (i.e. the transceiver is in a transmitting mode) when all of the PA switching devices 9 are off. A power supply 10 is connected to, and supplies voltage to, the balanced side of the balun 2 through a switch 3. During receiving mode, when the switching devices 9 are preferably all on, this power supply 10 needs to be isolated from the PA 3 to avoid the supply 10 being short-circuited. In this example, this is achieved by inserting an additional power supply switch 11 between the power supply 10 and the balun 2. Opening the switch 11 isolates the power supply 10 from the PA 3.

The primary requirement for the PA devices is that they must have an on-resistance that gives smaller impedances than the capacitances of the cascode nodes in order to eliminate unwanted poles. This requirement can readily be satisfied with MOSFETS as they are good switches. A cascode node is a two stage amplifier formed of a transconductance amplifier followed by a current buffer. A transconductance amplifier is used to output a current proportional to the input voltage. A current buffer is used for impedance matching between a low impedance circuit and a high impedance circuit.

Although this design is relatively simple to implement, the PA 3 will consume additional power through the power supply switch 11. For example, for an on-resistance of 100 mΩ for the power supply switch 11, a peak current consumption of 1 A will lead to around 100 mW of unwanted power dissipation in switch 11.

FIG. 10 illustrates a second possible example of a configuration that can act as a PA switch 4 to the PA 3. In the figure, a power supply 10 supplies voltage to the balanced side of the balun 2. The two outputs of the balanced side of the balun 2 are fed into differential PA 3. A variable capacitor 13 is arranged in parallel with the PA 3. During reception, when the PA 3 needs to be isolated from the LNA 5, the variable capacitor 13 is configured to have a much larger capacitance than the devices forming the PA 3. Therefore, the unwanted pole is moved to a frequency far enough away from the frequency of operation that there is minimal interference.

This arrangement achieves a negligible loss in the PA's efficiency.

It is useful to look at the effect this arrangement has on the noise figure (NF) of the LNA 5. The NF is a measure of how much a particular device contributes to the received signal noise compared to an ideal device with the same bandwidth and the same overall gain. It can be calculated by using the following equation:

$$NF = 10 \log(SNR_{in}/SNR_{out})$$

where $SNR_{in}$ represents the signal to noise ratio at the input of the device and $SNR_{out}$ represents the signal to noise ratio at the output of the device.

Since the coupling coefficient, k, has a finite value, the resistive loss on the balanced side of the balun 2 from the transmitting circuitry does not have a direct impact on the NF of the LNA. Therefore, the most dominant factor contributing to the NF is the series resistor, $R_s$, in the unbalanced side of the balun 2. The series resistance arises from components in series with the LNA that act as resistors.

As $R_s$ is in series with the external 50 ohm source impedance, $R_{50}$, from the antenna, the noise figure contribution can be evaluated using the following formula:

$$NF = 10 \log(1 + N_{added}/N_{50})$$

$$NF = 10 \log(1 + R_s/50)$$

where $N_{added}$ is the additional noise in the system and $N_{50}$ is the noise contribution of the 50 ohm source. Note that the source impedance is 50 ohm as standard for transceiver circuits.

As a numerical example, assume that the system is operating at a frequency of 6 GHz, that the balun has a turn ratio of 2:1, that the inductance of the unbalanced side of the balun is 2.5 nH and that the unbalanced side of the balun has a quality factor, Q, equal to 10 at 6 GHz. Using these figures and the formula $Q = \omega L/R$ (where w is $2\pi$ times the frequency of operation), gives an $R_s$ value of approximately 10 ohm. Substituting this $R_s$ value into the equation for NF, above, gives an NF value of around 0.8 dB. Conventional circuits typically have a NF for the on-chip baluns in the range of 1-1.5 dB for a typical system frequency of 6 GHz.

In practice, it has been found that the coupling capacitances and resistance losses from the balanced side of the balun 2 increase the contribution to the NF of the balun. Using a high frequency structure simulator (HFSS), the NF of the baluns was predicted to vary from about 1 to 1.5 dB.

The above demonstrates the advantage of placing the PA 3 and the LNA 5 on different sides of the balun. Although it is in the common interest for both the PA 3 and the LNA 5 to achieve a low loss through the balun 2, there is no additional requirement on the PA 3 design to reduce the NF for the LNA. The NF of the LNA 5 is improved when impedance matched to a high input impedance. However, the PA 3 normally needs to deliver a high output power and so the balun is chosen to perform a high-to-low impedance transformation. LNAs positioned on the balanced side of the balun are therefore normally impedance matched to a low input impedance, which results in a higher NF than if they were impedance matched to a high input impedance. By arranging the components for the transmitting circuitry and the components for the receiving circuitry on different sides of the balun, the LNA 5 does not have to be impedance matched to a low input impedance and so the NF is improved. The design criteria of the transmitting circuitry is no longer dominantly dependent on the design criteria of the receiving circuitry. Designers therefore have much more freedom in selecting various components than in conventional transceiver architecture.

Figure 11:
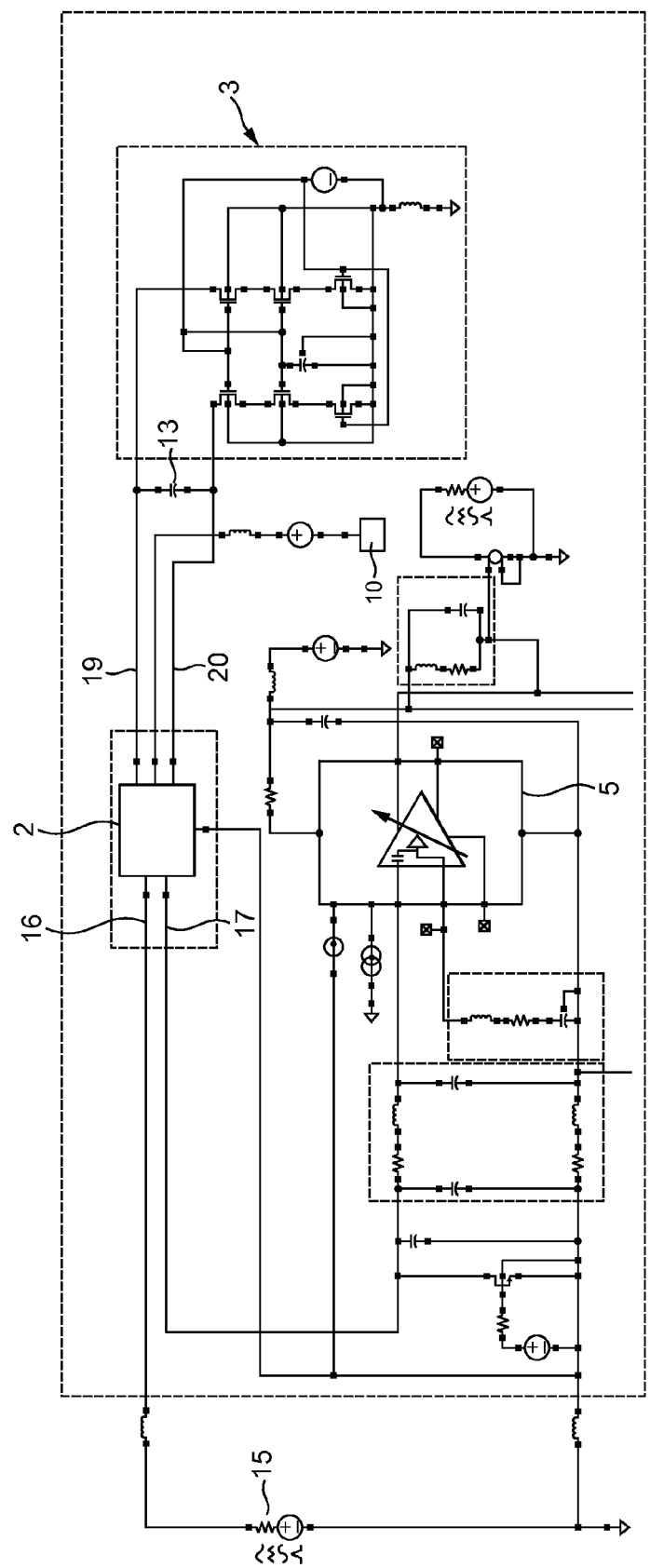
FIG. 11 shows a test bench circuit of the transceiver.

A high frequency structure simulation (HFSS) was used to simulate the noise arising from the various components on the transceiver. An illustration of a full schematic test bench used in the HFSS can be seen in FIG. 11. This figure incorporates the equivalent circuitry illustrated in b of FIG. 6. In FIG. 11, an antenna is associated with a port 15 from which the s-parameter of the antenna can be measured. The antenna is further connected to a port 16 at the top end of the unbalanced side of the balun 2 such that the balun can receive an input from port 16 or can output an output to port 16. Also on the unbalanced side of the balun 2, there is a port 17 that outputs a signal to an LNA 5, the LNA 5 also being located on the unbalanced side of the balun. The LNA 5 is connected to the antenna through the unbalanced side of the balun by a port on the bottom end of the unbalanced side of the balun 3.

Figure 12A:
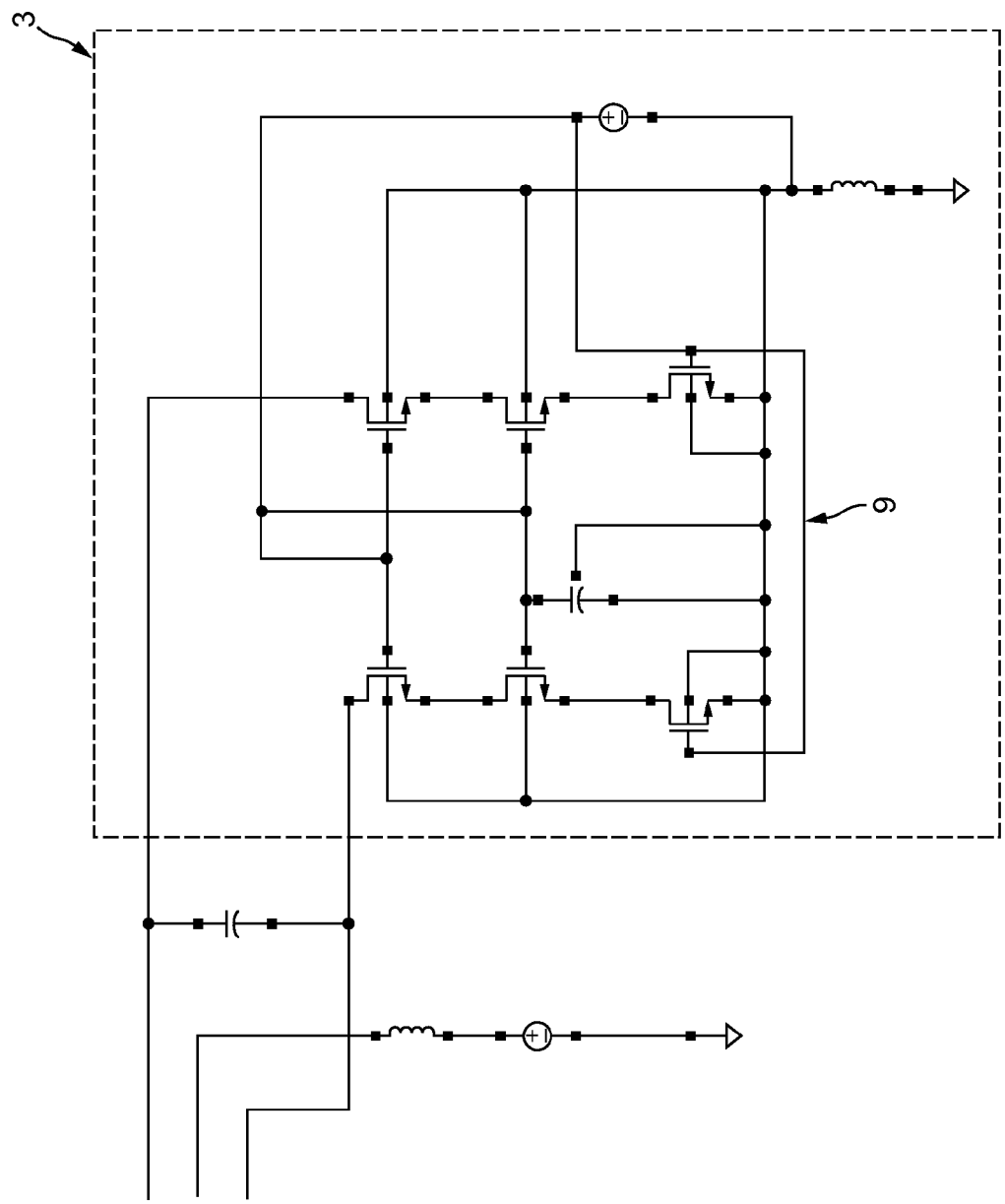
FIG. 12a shows a test bench circuit of the power amplifier.

On the balanced side of the balun 2, the balun has two ports, 19, 20, to be used as inputs/outputs of signals by the PA 3. The cascode devices of the PA 3 can be seen more clearly in FIG. 12a. The PA 3 illustrated in these examples is composed of real transistor devices, according to an existing design. During receiving mode, the devices are configured to act as a short across the balanced side of the balun 2 as depicted in FIG. 10. The cascode devices of the PA 3 have a single-ended on-resistance of about 2 ohm with 1.1V on the gate. They also have a capacitance in saturation mode of about 2 pF, i.e. 13 ohm at a frequency of 6 GHz. This illustrates how effective these PA devices can be when acting as a short (such as in FIG. 10) as they have an on-resistance that gives a smaller impedance than the impedance of the capacitances (as required to remove the unwanted poles).

Figure 12B:
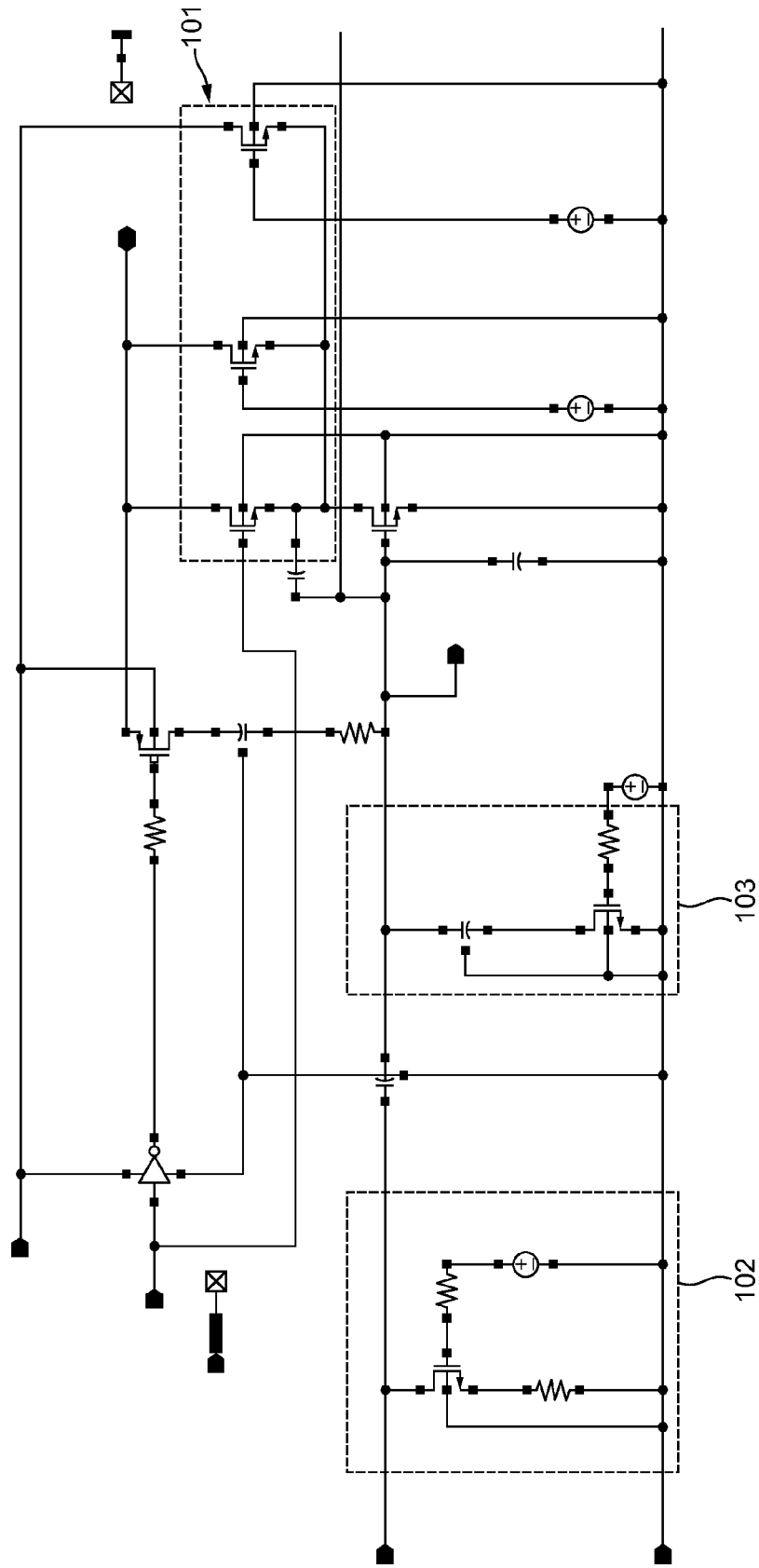
FIG. 12b shows a test bench circuit of the receiving circuitry.

FIG. 12b illustrates the test bench circuit for the LNA 5. The LNA 5 used in this example is a resistive-feedback LNA. A resistive feedback LNA is used to DC bias the LNA circuit. DC biasing is performed to assist the device in delivering a stable thermal performance and in reducing the influence of the DC current gain spread ($h_{FE}$). The receiving circuitry includes a gain step stage 101. Gain step stages are useful in controlling the gain applied to a signal before processing in response to the received signal strength. Switching between different gains can involve a change in the impedance of a circuit. Therefore, the receiving circuitry further includes an input impedance matching stage 102 that can vary with the gain step stage 101. The receiving circuitry also includes an input tunable capacitor 103 which is varied in response to the incoming frequency in order to remove unwanted poles.

The s-parameter values at different frequencies using this test bench simulation are shown in FIGS. 13A-13C. FIG. 13A illustrates the s-parameter response for $S_{11}$, which is a measure of the noise experienced by the antenna. There is a large peak of around −37.5 dB in $S_{11}$ at a frequency of 6 GHz, which is the frequency of operation of the system. FIG. 13B illustrates the noise figure (NF) and the minimum noise figure ($NF_{min}$) results at different frequencies. At the frequency of operation, they have a peak in their noise value of around 4.8 dB. Of this, around 1.4 dB is contributed from the PA balun through its resistances and losses. Finally, FIG. 13C illustrates the s-parameter response for $S_{21}$, which represents the noise experienced by the LNA. At 6 GHz, $S_{21}$ has a value of around 24.1 dB.

TABLE 1

Noise contribution of various components

| Device | Parameter | Noise contribution ($V^2$/Hz) | % of total |
|---|---|---|---|
| Port Antenna | Rn | 4.6e-17 | 33.32 |
| R LNA Inductor | Rn | 2.3e-17 | 16.85 |
| LNA Core | Id | 2.2e-17 | 16.13 |

TABLE 1-continued

Noise contribution of various components

| Device | Parameter | Noise contribution ($V^2$/Hz) | % of total |
|---|---|---|---|
| RFB | Rn | 7.9e-18 | 5.72 |
| Nport0 | Rn4 | 5.3e-18 | 3.83 |
| Nport0 | Rn1 | 4.5e-18 | 3.26 |
| Cas1 | Id | 4.0e-18 | 2.87 |
| Port1 | Rn | 3.2e-18 | 2.34 |
| Nport0 | Rn2 | 2.4e-05 | 1.75 |
| LNA Core rg | Rn | 2.0e-18 | 1.42 |
| PA GND Short rb | Rn | 1.5e-18 | 1.09 |
| LNA Core rb | Rn | 1.4-e18 | 1.04 |

After running the simulation, values for the noise contributions of various components of the LNA were obtained. These results are contained in Table 1.

The total noise of the LNA is about 1.4 e-16 $V^2$/Hz, with a total input noise of 6.2 e-19 $V^2$/Hz. The dominant noise sources are (excluding the 500 ohm source from the antenna port):

1) The noise from the resistance of the internal input inductance of the LNA (R LNA inductor);
2) The thermal noise of the drain current of the LNA core device (LNA Core);
3) The thermal noise of the feedback resistor (RFB) used to DC bias the LNA; and
4) The resistive noise from the unbalanced side of the PA balun (Nport0).

The first 3 terms are also usually present as noise contributors in a wideband resistive-feedback LNA. The fourth item represents the resistive noise/loss from the is unbalanced side of the PA balun. As predicted from the earlier theoretical model, this is the major noise contribution from the PA balun. It does not form a major part of the overall LNA noise (around 3.8%). This is partly due to the finite k factor of the balun, which means that the losses arising from the balanced side of the PA balun are insignificant.

In Table 2, typical LNA and PA parameters obtained using the present invention, a conventional TA switch (as illustrated in FIG. 1) and an external switch are illustrated.

It can be seen from this table that using the example fully integrated transmit receive (TR) switch produces a much lower noise figure than using a conventional TR switch such as that shown in FIG. 1 (~2 dB). Although using an external switch can produce a lower noise figure, it is desirable to form transceiver circuitry so that is completely integrated. This is partly because using external switches can lead to a larger power loss in the PA than is achieved with integrated circuitry (as shown in the table above). This can shorten the battery life of devices with external switches over integrated switches.

Preferably, the transmitting circuitry and receiving circuitry are both integrated on the same chip. Preferably, the balun is also integrated onto the same chip as the receiving circuitry and transmitting circuitry.

TABLE 2

Comparison of results for different balun arrangements

| LNA Parameters | Unit | Ideal | Example Fully Integrated Transmit/Receive Switch | | | Conventional transmit/receive switch | External switch |
|---|---|---|---|---|---|---|---|
| | | | Balun A | Balun B | Balun C | Balun D | Balun B |
| Operating Frequency | GHz | 5.45 | 5.45 | 5.45 | 5.45 | 5.45 | 5.45 |
| Operating Current Consumption | mA | 7.5 | 9 | 9 | 9 | 18 | 9 |

TABLE 2-continued

Comparison of results for different balun arrangements

| | | Ideal | Example A | Example B | Example C | Example D | Example B |
|---|---|---|---|---|---|---|---|
| Voltage Gain | dB | 22 | 23 | 23 | 23 | 22 | 22 |
| Total noise figure (sum of the next 5 cells) | dB | 4.44 | 5.5 | 5.2 | 5.8 | 7.6 | 4.8 |
| Simulated Contribution from PA's Balun | dB | | 1.4 | 1.1 | 1.7 | 1.5 | 0 |
| Losses from external switch | dB | | 0 | 0 | 0 | 0 | 0.7 |
| Simulated Noise figure | dB | | 3 | 3 | 3 | 5 | 3 |
| Estimated Induced Gate Noise | dB | | 0.1 | 0.1 | 0.1 | 0.1 | 0.1 |
| Estimate for parasitics and gamma factor | dB | | 1 | 1 | 1 | 1 | 1 |
| S11 | dB | <−10 | −15 | −15 | −15 | −15 | −15 |

| PA Parameters | Unit | Ideal | Example A | Example B | Example C | Example D | Example B |
|---|---|---|---|---|---|---|---|
| Additional Power Loss (with estimated parasitics) | dBm | N/A | 0.25 | 0.25 | 0.25 | 0 | 0.7 |
| Additional power consumption | mV | N/A | 30 | 30 | 30 | 0 | 0 |
| External Components | | N/A | 0 | 0 | 0 | 0 | 1 |

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A transceiver comprising;
a first circuit comprising a connector for connection to an antenna and receiving circuitry; and
a second circuit comprising transmitting circuitry;
wherein the first and second circuits are coupled using a balun having first and second sides, the first side being an unbalanced side and the second side being a balanced side, the balun being arranged so that its first, unbalanced side is in the first circuit and its second, balanced side is in the second circuit.

2. A transceiver as claimed in claim 1, wherein the unbalanced side of the balun is arranged in the first circuit in such a way that, when the transceiver is receiving a signal, the receiving circuitry receives a signal from the antenna through the unbalanced side of the balun.

3. A transceiver as claimed in claim 1 wherein the receiving circuitry comprises a first switching arrangement and the transmitting circuitry comprises a second switching arrangement.

4. A transceiver as claimed in claim 3 wherein the first and second switching arrangements are arranged to be operated so that either the transmitting circuitry is arranged to transmit a signal or the receiving circuitry is arranged to receive a signal.

5. A transceiver as claimed in claim 3, wherein the receiving circuitry is arranged to receive a signal when a switch in the first switching arrangement is open and is not arranged to receive a signal when said switch in the first switching arrangement is closed.

6. A transceiver as claimed in claim 3, wherein the transmitting circuitry further comprises a differential power amplifier that is arranged to transmit signals to the antenna through both the balanced and unbalanced sides of the balun by inputting a signal into both ends of the balanced side of the balun.

7. A transceiver as claimed in claim 6, wherein the receiving circuitry comprises a first switching arrangement and the transmitting circuitry comprises a second switching arrangement and wherein the second switching arrangement comprises a variable capacitor, the variable capacitor being arranged in parallel with the power amplifier and wherein the transmitting circuitry is arranged to either transmit signals or to not transmit signals in dependence on the capacitance of the variable capacitor.

8. A transceiver as claimed in claim 6, wherein the receiving circuitry comprises a first switching arrangement and the transmitting circuitry comprises a second switching arrangement and wherein the power amplifier comprises switching devices that act as the second switching arrangement.

9. A transceiver as claimed in claim 8, wherein the switching devices must all be on to deactivate the transmitting circuitry.

10. A transceiver as claimed in claim 1, further comprising a power supply, wherein the power supply supplies power to the balanced side of the balun and wherein there is a switch interposed between the power supply and the balun.

11. A transceiver as claimed in claim 3, wherein when the transceiver is receiving a transmission or expecting to receive a transmission imminently, the first switching arrangement is arranged so that the receiving circuitry is arranged to receive signals and the second switching arrangement is arranged so that the transmitting circuitry is arranged to not transmit signals.

12. A transceiver as claimed in claim 3, wherein when the transceiver is transmitting a transmission or expecting to transmit a transmission imminently, the first switching arrangement is arranged so that the receiving circuitry is arranged to not receive a signal and the second switching arrangement is arranged so that that transmitting circuitry is arranged to transmit a signal.

13. A transceiver as claimed in claim 1, wherein the receiving circuitry comprises a single ended low noise amplifier, the low noise amplifier receiving its input from one of the ends of the balun on the unbalanced side of the balun.

14. A transceiver as claimed in claim 1, wherein the receiving circuitry comprises a resistive feedback low noise amplifier that can be arranged to receive a signal from the antenna in addition to a feedback signal.

15. A transceiver as claimed in claim 1, wherein the transmitting circuitry, receiving circuitry and balun are integrated onto a single chip.

16. A transceiver as claimed in claim 1, wherein there is a tuning capacitor arranged in parallel with the unbalanced side of the balun, wherein the transceiver is arranged to transmit or receive a signal with a frequency that lies within a signal band of interest and the capacitance of the tuning capacitance is configured such that the frequency of any pole generated by the transceiver when in operation lies outside of said signal band of interest.

17. A transceiver as claimed in claim 16, wherein the receiving circuitry comprises a first switching arrangement and the transmitting circuitry comprises a second switching arrangement and wherein the tuning capacitor is further arranged to be in parallel with the first switching arrangement.

18. A transceiver as claimed in claim 1, wherein the receiving circuitry and the unbalanced side of the balun are arranged in the first circuit in parallel.

19. A transceiver as claimed in claim 18, wherein the first circuit further comprises a first capacitor, wherein the first capacitor is arranged in series with the receiving circuitry and arranged in parallel with the unbalanced side of the balun, and wherein the transceiver is arranged to transmit or receive a signal of a frequency that lies within a signal band of interest and the capacitance of the first capacitor is configured such that the frequency of any pole generated by the transceiver when in operation lies outside of said signal band of interest.

20. A transceiver as claimed in claim 18, wherein the first circuit further comprises a second capacitor, wherein the second capacitor is arranged in parallel with both the receiving circuitry and the unbalanced side of the balun, wherein the transceiver is arranged to transmit or receive a signal of a frequency that lies within a signal band of interest and the capacitance of the second capacitor is configured such that the frequency of any pole generated by the transceiver when in operation lies outside of said signal band of interest.

21. A transceiver as claimed in claim 1, wherein the transceiver has a receive path comprising the receiving circuitry, the receive path being capable of performing receive processing on signals received from the antenna connector and being independent of the transmitting circuitry.

22. A transceiver as claimed in claim 1, wherein the transceiver has a transmit path comprising the transmitting circuitry, the transmit path being capable of performing transmit processing on signals to be sent to the antenna connector and being independent of the receiving circuitry.

23. A transceiver as claimed in claim 1, wherein the transceiver comprises a signal path from the unbalanced side of the balun to the antenna connector and a receive path that branches from that signal path, wherein the receive circuitry is arranged in the receive path.

24. A transceiver as claimed in claim 23, wherein there is a tuning capacitor in the receive path, and wherein the transceiver is arranged to transmit or receive a signal with a frequency that lies within a signal band of interest and the capacitance of the tuning capacitance is configured such that the frequency of any pole generated by the transceiver when in operation lies outside of said signal band of interest.

25. A transceiver for receiving and transmitting data, comprising:
   a first circuit comprising a connector for connecting to an antenna and receiving circuitry; and
   a second circuit comprising transmitting circuitry;
   wherein the first and second circuits are coupled using a balun having first and second sides, the first side being an unbalanced side and the second side being a balanced side, the balun being arranged so that its first, unbalanced side is in the first circuit and its second, balanced side is in the second circuit; and
   wherein the unbalanced side of the balun is arranged in the first circuit in such a way that, when the transceiver is receiving a signal, the receiving circuitry receives a signal from the antenna through the unbalanced side of the balun.

* * * * *